Figure 1:
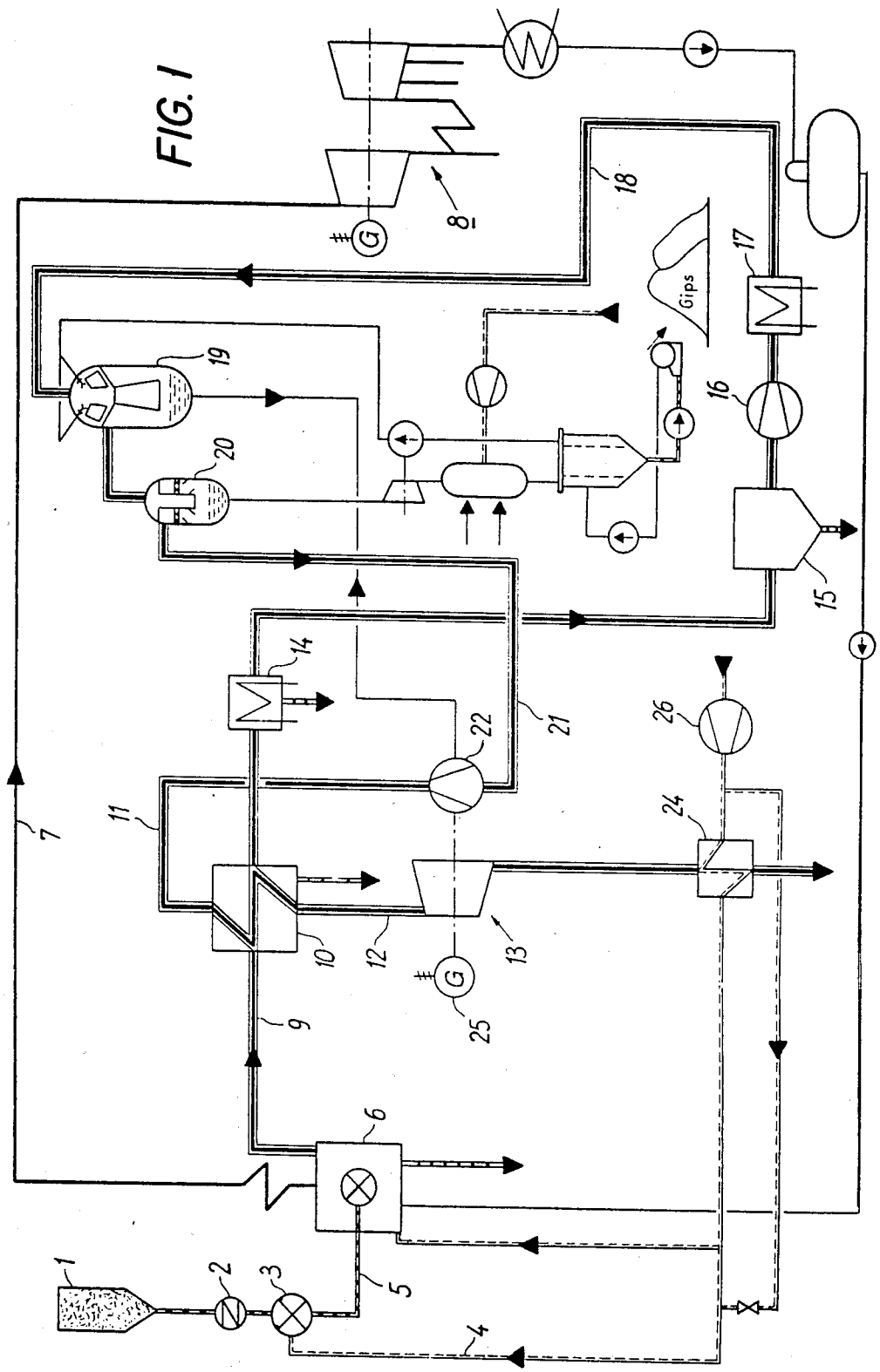

United States Patent [19]

Adrian et al.

[11] Patent Number: 4,569,197
[45] Date of Patent: Feb. 11, 1986

[54] METHOD FOR PRODUCING ENERGY FROM SOLID, FOSSIL AND BALLAST RICH FUELS

[75] Inventors: Fritz Adrian, Ratingen; Boris Dankow, Essen; Klaus Heyn, Essen; Hans-Joachim Pogrzeba, Essen, all of Fed. Rep. of Germany

[73] Assignee: STAEG AG, Essen, Fed. Rep. of Germany

[21] Appl. No.: 668,285

[22] Filed: Nov. 5, 1984

Related U.S. Application Data

[63] Continuation of Ser. No. 566,190, Dec. 28, 1983, abandoned, which is a continuation of Ser. No. 277,214, Jun. 25, 1981, abandoned.

[30] Foreign Application Priority Data

Jun. 28, 1980 [DE] Fed. Rep. of Germany ....... 3024479

[51] Int. Cl.⁴ ............................................. F02C 3/26
[52] U.S. Cl. ................ 60/39.02; 60/39.182; 60/39.464
[58] Field of Search ............... 60/39.02, 39.12, 39.182, 60/39.464

[56] References Cited

U.S. PATENT DOCUMENTS

| | | | |
|---|---|---|---|
| 2,770,947 | 11/1956 | Ledinegg | 60/39.464 |
| 3,990,229 | 11/1976 | Staege | 60/39.182 |
| 4,255,926 | 3/1981 | Heyn et al. | 60/39.182 |
| 4,342,192 | 8/1982 | Heyn et al. | 60/39.182 |

*Primary Examiner*—Louis J. Casaregola
*Attorney, Agent, or Firm*—Michael J. Striker

[57] ABSTRACT

Energy is produced from solid fossil fuel high in inerts by burning a fuel under atmospheric pressure with production of smoke gas so that heat is released during the burning and stored in the smoke gas. Thereupon the burning of the fuel, water steam is generated from the heat released and stored in the smoke gas, which steam is used for operation of a steam turbine. The smoke gases are cleaned from noxious materials, compressed and desulfurized. The obtained cleaned gas is provided to cool the smoke gas discharged after burning and to operate a gas turbine. The expanded gas is then used to preheat air which is used for burning the fuel.

6 Claims, 3 Drawing Figures

METHOD FOR PRODUCING ENERGY FROM SOLID, FOSSIL AND BALLAST RICH FUELS

This is a continuation of application Ser. No. 566,190, filed Dec. 28, 1983 (abandoned), which in turn is a continuation of application Ser. No. 277,214, filed on June 25, 1981 (abandoned).

The invention relates to a method for producing energy from solid, fossile and ballast rich fuels, whereby the fuel is burned and the released heat is converted into electrical energy in a steam turbine, and that the smoke gases are cleaned before being emitted.

Furthermore, the invention relates to a device for carrying out this method.

Within the framework of the invention, the invention relates, in particular, to produce energy from ballast rich mineral coal. Therefore, sulfur must be removed from the smoke gases. In accordance with the invention other hazardous materials are removed from the smoke gases before they are emitted, like Cl, HCl, F, HF, and $NO_x$. The dust removal of the smoke gases is carried out with a dust removal degree which can be above the dust removal degrees of E-filters.

Such devices are already known wherein the heat is released in a pressure heated boiler with cyclon heat, so that the smoke gases are generated with the initial pressure of about 10 bar which corresponds to the operating pressure gradient in the gas turbine. However, in the practical realization of such boilers great difficulties were encountered which make the use of such boilers nonoperable for some time to come.

In addition, a boiler is known with a pressure turbulence charge heat consisting of a combination block of a gas turbine and a steam turbine. The hot smoke gas discharges from the pressure turbulence charge heat at a temperature which is lower than 900° which is then fed to a cyclon device and to an electrofilter for removing the dust. Thereby, the total ash is discharged from the turbulence charge heat, so that the consecutive filters are correspondingly stressed. The difficulties in such a method are inherited in the smoke gas dust removal which must be carried out at a high temperature, high pressure and high ash stress. It also had been shown that with this method using the cyclone device one cannot obtain the purity of the turbine gas with respect to the dust content which is required for the gas turbine, and that with respect to the high pressure loss at a possible high degree of dust removal, such a dust removal device for the thermical total degree of effectiveness is not economical. An electrofilter, switched in series requires a large structure volume at a high temperature and a high pressure, so that these electrofilter are not suitable for large installations. Furthermore, the required smoke gas purity with respect to the dust content cannot be obtained with an electrofilter.

Finally a method is known from (VDI-Reports No. 322,1978), wherein a pressureless turbulence charge heater is coupled with a hot air turbine and a steam turbine operation. In contrast to the combination block with pressure heated turbulence charge heat, this known method is disadvantageous in that it requires a very large construction volume. Here too, the smoke gas cleaning is carried out at the end of the installation at discharge gas temperature, so that almost the total ash must follow the path of the smoke gas cooling. This results in a rapid contamination of the heating faces which are required for the steam operation and therefore to a thermical reduction of the thermic degree of effectiveness of the installation.

It is an object of the invention to carry out the producing of power with a high technical degree of effectiveness by circumventing all hitherto encountered difficulties.

This object is obtained in accordance with the invention that the required water steam for the steam turbine operation is generated from the heat which is released during and from the heat stored in the smoke gases, and that subsequently at least a part of the smoke gases is cleaned from hazardous material, is cooled and compressed to be used as machine gas for the gas turbine operation.

In accordance with the invention the dust removal is carried out at low smoke gas temperatures and low (atmospheric) pressures and the removal of the hazardous material at low smoke gas temperatures and high smoke gas pressures. Thereby, it is possible to use known methods and installation for the removal of hazardous material which also is advantageous in that it requires to construct small and requires low investment costs. In contrast to the conventional installation which, for example, use a dry heating or a melt heating, the combined gas-steam turbine operation provides an improved thermic degree of effectiveness.

The inventive method may be so carried out that the smoke gas is cooled, for example, to 1000° when generating the water steam required for the steam turbine operation and then it is subjected to the gas-gas heat exchange with the cleaned gas from which the dust is removed. In accordance with one embodiment of the invention it is provided that subsequent to the steam generation the smoke gas flow is separated into a partial flow for generating high pressure steam by use of waste heat and into the partial smoke gas flow which is to be cooled, and that the two partial flows are again reunited before removal of the hazardous materials.

This results in the advantage that one obtains the possibility to control the operation through the waste heat boiler and the described smoke gas cycle, so that the steam operation or the gas turbine may be controlled by heat displacement. Furthermore, a $NO_x$ poor heating is permitted. The waste heat boiler permits an optimum use of the heat which is present in the smoke gas cycle.

In accordance with a further embodiment of the inventive method the smoke gas flow which is cooled by heating the machine gas is subjected to a trimming cooling before its dust removal. This trimming cooling can be used in varies ways. For example, the heat can be fed to the steam cycle operation. In particular, it can be used for providing the remote heat supply as required, whereby the steam operation is improved because the decarnotisation can be partly reversed.

In another embodiment of the inventive method, the cooled and trimmed smoke gases, after the dust removal, are subjected to a supercharging and a subsequent cooling for a pressure desulfurisation, wherein a removal of the fine dust and the removal of further hazardous material takes place.

In a further embodiment of the invention the smoke gases which cleaned from hazardous materials are subjected to a spray separator together with the smoke gas emitted from the steam generation and a simultaneous supercharging which is used as a remainder spray separation on the gas turbine inlet pressure, before the heat exchange.

Due to this two stage supercharging of the machine gas, the gas pressure for the gas turbine can be optimized, on the one hand. On the other hand, the pressure increase can be carried out almost isotherm.

In accordance with a further embodiment of the inventive method the air preheating for the boiler is carried out by the discharge gases of the gas turbine. This permits to adjust the air amount to the load, because it simultaneously depends from the fresh air control of the boiler.

Figure 2:
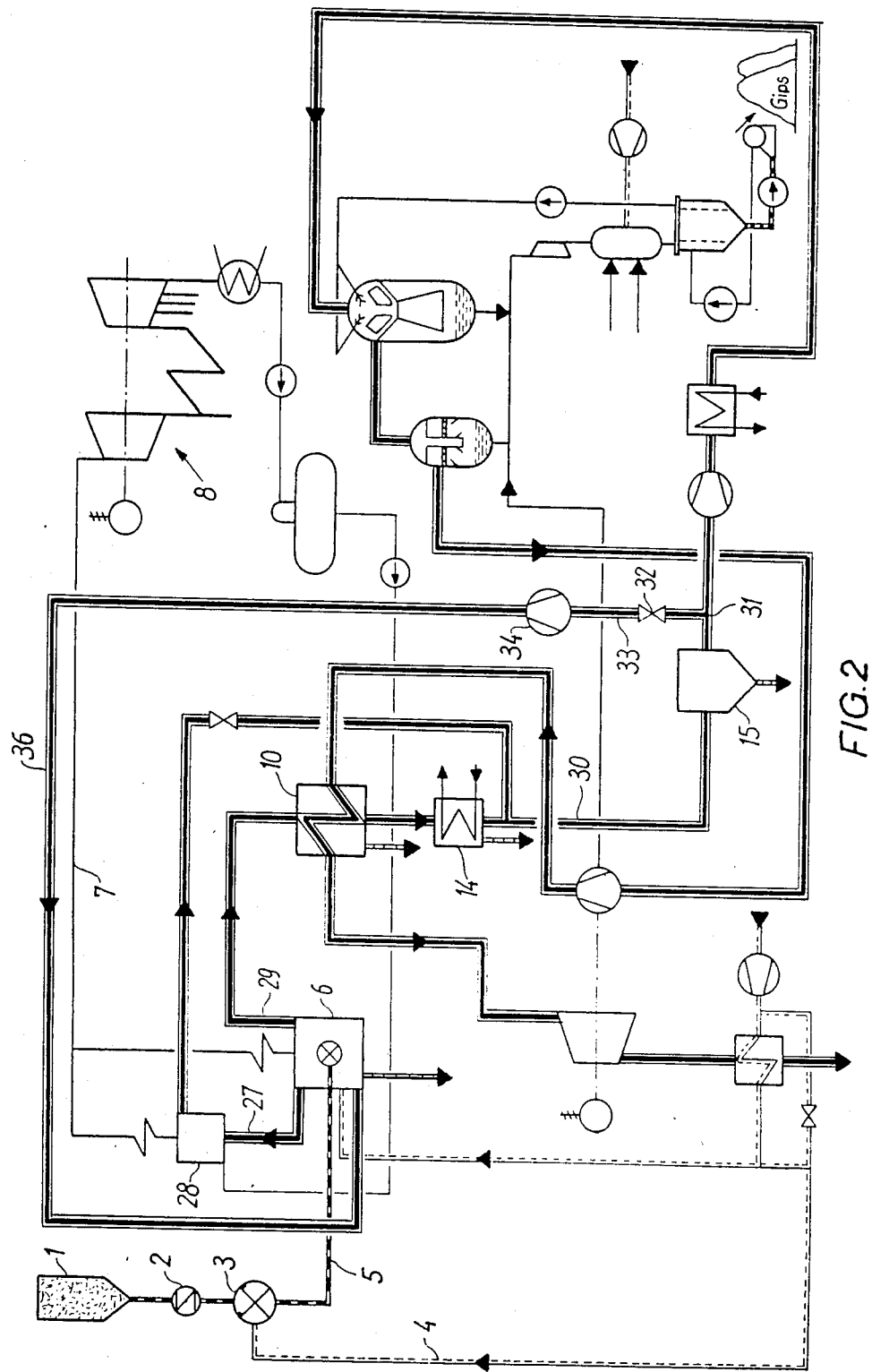
Figure 3:
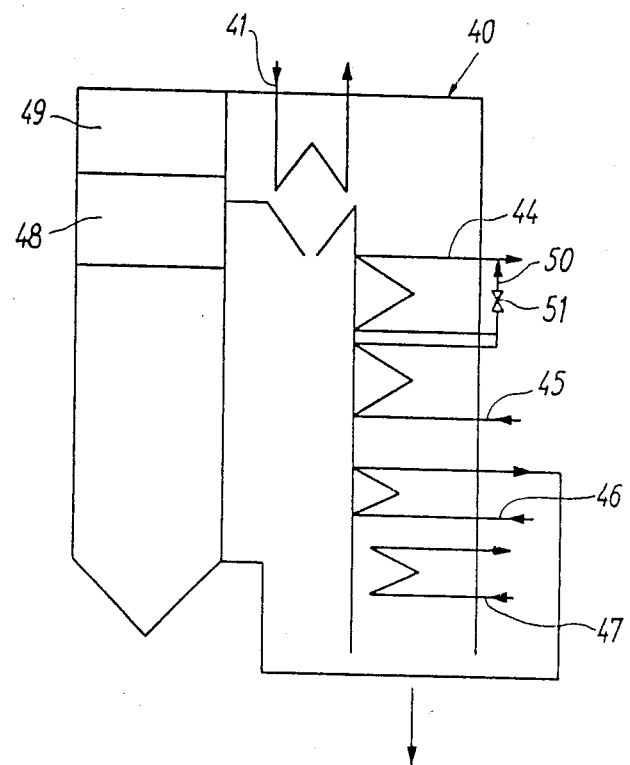

The details, further features and other advantages can be taken from the following description of a plurality of embodiments of the inventive device in conjunction with ordinary machines which are shown in the drawings; the drawings show:

FIG. 1 a first embodiment of the inventive device in conjunction with an ordinary machine, FIG. 2 one embodiment of the inventive device with conventional coal boiler and smoke gas recirculation, and;

FIG. 3 schematically a boiler for the inventive method by deleting all details which are not required for understanding the invention.

In accordance with FIG. 1, coal is supported from a coal supply 1 through a preparation device which consists of a coal feeding line 2 and a coal mill 3 with the assistance of primary air from line 4 through line 5 and to a boiler with dry heat or melt heat and is burned therein. The boiler is designated with the reference numeral 6. The heat which is released during burning and which is stored in the smoking gas generates the water steam required for the steam turbine operation. Accordingly, the water steam is fed through a line 7 into the steam turbine 8, which in accordance with the shown embodiment is tapped at various locations.

The smoke gas cools to about 1000° C. during the steam generation. It is fed through line 9 into a gas-gas heat exchanger 10 and is cooled therein in the counter current method with cooled and cleaned smoke gas from line 11. Simultaneously, the gas which comes from line 11 is heated to about 900° C. in line 12 and is used as a machine gas for a gas turbine 13.

A further cooling of the smoke gas is carried out through a trimming cooler 14 behind the gas-gas-heat exchanger 10, whereby the smoke gas is cooled, for example, to about 100° C. Thereby, the heat is transmitted to an HD-Eco and ND-Eco. The smoke gas is fed with this temperature into a dust remover which is designed as an electro filter 15. Instead of an electro-filter, a cyclone or a cloth filter may be used, because the smoke gases are cold. Subsequently, the smoke gases are supercharged to about 5 atmospheric excess pressure at 16 with a super charger which is also used as a suction device for boiler 6 (with the atmospheric pressure being in the heating).

Switched in series to the supercharger a cooler 17 is provided in which the smoke gas is cooled down to the proximity of the water dew point (at 3.4 bar, about 80°). Thereby the heat is transferred to an ND-Eco. Behind this cooler the smoke gas is fed through 18 into a pressure desulfirizer 19. Thereby it is a wet desulfirisation which simultaneously is used for removal of fine dust and other hazardous materials like, for example, Cl, HCl, F, HF and $NO_x$. Subsequently, the smoke gas is fed through a spray separator 20 into a supply line 21 to a pressure increase secondary compressor 22 which simultaneously is used as a remainder spray separator. Thereby, the smoke gas is brought to the end pressure of the machine gas which is required for the gas turbine. Behind the the pressure increase compressor 22 the gas-gas-heat exchanger is switched in series wherein the machine gas is heated to the gas turbine temperature of 900° C. Behind the gas turbine 13 the expanded smoke gas is fed through a Luvo 24 and into the discharge conduit.

A generator 25 is mounted on a shaft of the gas turbine 13, as well as the pressure increase compressor 22. The burning air is preheated in the Luvo 24 and the air is sucked in by a fresh air intake 26. The heating is carried out to about 400° C.

The trimming cooler 14 is integrated partly as a high pressure preheater and partly, as is cooler 17 behind the precompressor, as a low pressure preheater into the steam operation.

In accordance with the embodiment of FIG. 2, the smoke gas flow separates into a separate partial flow 27 behind boiler 6 which is fed to a waste heat boiler 28. High pressure steam is generated in the waste heat boiler and is fed into supply line 7 to the steam turbine 8. Thereby, the smoke gas cools to a temperature which corresponds to the smoke gas temperature behind the trimming cooler 14. The trimming cooler 14 is admitted by the other partial flow 29 which is first fed the gas-gas-heat exchanger 10.

The smoke gas flows unite at 30 behind the trimming cooler 14 and are fed together into the dust remover 15. Behind the dust remover the smoke gas flows separate at 31. A partial flow 33, which can be controlled by a control member 32, is fed into the recycle blower 34 and through a line 36 back into boiler 6.

Otherwise, the device in accordance with FIG. 2 corresponds to the embodiment in accordance with FIG. 1.

In accordance with the embodiment in accordance with FIG. 3 the transitory super heater 48, the intermediary super heater 49 and the end super heater 41 of the steam operation are disposed in the hottest part in a boiler 40.

Behind the end superheater the hot smoke gases, about 1000° C., flow at first to a gas heater 44 and then to a gas heater 45. The two gas heaters 44 and 45 are admitted in the counter current with respect to the smoke gases, so that the gases which enter the gas heater 45 at a temperature of about 200° C. discharge from the gas heater 44 at a temperature of about 900° C. A by-pass 50 with a control member 51 is switched parallel to the gas heater 44 (gas temperature control). Subsequent to the two gas heaters a HD-Eco 46 or a ND-Eco 47 is switched which actually are the trimming cooler 14 and the cooler 17.

A pre-superheater 48, an intermediary superheater 49 are radiation superheaters as a wall face, the end superheater 41 is a radiation superheater as a wall face or as a platen. If a dry heat is used, the end superheater 41 would be a platen superheater.

Particularly advantageous is an embodiment, not shown, wherein the pipes for the gas pipes of the end heater 44 and/or the preheater 45 are disposed adjacent and alternately with the steam pipes of the end superheater 41. In this case, the heat of the smoke gases can be transferred selectively to steam and/or smoke gas with the assistance of control member 51 and the superheat injection, so that the operation can be easily controlled.

We claim:

1. A method of producing energy from solid, fossil fuels high in inerts, comprising the steps of:
   burning the fuel to heat water for producing steam and to produce non-combustible smoke gas under substantially atmospheric pressure with preheated burning air;
   expanding the thus produced steam in a steam turbine;
   cooling at least part of the smoke gas to a first temperature by heat exchange between the smoke gas and a cooling gas;
   dedusting the cooled smoke gas;
   compressing the dedusted smoke gas;
   using a liquid desulfurizing agent for desulfurization of the compressed smoke gas;
   using the compressed desulfurized smoke gas as the cooling gas;
   expanding the cooling gas heated by the heat exchange in a gas turbine;
   cooling the expanded cooling gas by heat exchange between the expanding cooling gas and air wherein the heated air is used as preheated burning air for the atmospheric burning of the fuel; and
   compressing the obtained cooling gas after the desulfurization for providing a pressure corresponding to the operational inlet pressure of the gas turbine wherein the compressing step is prior to the cooling step.

2. A method as defined in claim 1, and further comprising the steps of dividing the smoke gas into a first flow for generating high pressure steam by heat exchange between the first flow and water, and into a second flow which is cooled by the cooling gas;
   and reuniting the first and the second flows before the dedusting step.

3. A method as defined in claim 1, further comprising the step of branching off a partial flow of the smoke gas behind said dedusting step and recycling the partial flow to the burning step.

4. A method as defined in claim 1, and further comprising the step of additionally cooling the smoke gas subsequently to the cooling step to a second temperature which is lower than the first temperature by heat exchange between the smoke gas and water thereby preheating water which is to be used for production of steam.

5. A method according to claim 1, further comprising the step of removing liquid droplets from the desulfurized smoke gas.

6. A method as defined in claim 1, and further comprising the step of cooling the expanded cooling gas leaving the gas turbine to a temperature slightly above the dew point temperature of the smoke gas.

* * * * *